United States Patent [19]

Shaw et al.

[11] 4,044,851

[45] Aug. 30, 1977

[54] CYCLE PROPELLED BY MOTOR AND PEDALS

[75] Inventors: Leslie Thomas Shaw, Birmingham; Charles Patrick Duncan Davidson, Droitwich, both of England

[73] Assignee: Lucus Industries Limited, England

[21] Appl. No.: 650,871

[22] Filed: Jan. 21, 1976

[30] Foreign Application Priority Data

Jan. 21, 1975 United Kingdom ............ 2629/75

[51] Int. Cl.² .................................................. B62D 3/00
[52] U.S. Cl. .................................. 180/33 C; 180/34; 200/61.12
[58] Field of Search ............ 180/34, 65 R, 65 A, 180/33 C; 200/61.89, 61.12

[56] References Cited

U.S. PATENT DOCUMENTS

| 598,819 | 2/1898 | Scott | 180/34 |
|---|---|---|---|
| 2,170,088 | 8/1939 | Murray et al. | 200/61.12 |
| 2,546,610 | 3/1951 | Pacurar | 200/61.12 |
| 2,917,122 | 12/1959 | Quisenberry | 200/61.89 X |
| 3,533,484 | 10/1970 | Wood | 180/34 X |
| 3,598,195 | 8/1971 | Steller | 180/34 |
| 3,713,502 | 1/1973 | Delaney | 180/65 A X |
| 3,773,131 | 11/1973 | Jaumles | 180/34 |
| 3,827,519 | 8/1974 | Snider | 180/65 X |
| 3,921,745 | 11/1975 | McCulloch et al. | 180/33 C |
| 3,939,932 | 2/1976 | Rosen | 180/33 C |

FOREIGN PATENT DOCUMENTS

| 915,600 | 7/1946 | France | 180/65 |
|---|---|---|---|
| 443,948 | 2/1968 | Switzerland | 180/34 |

Primary Examiner—Philip Goodman
Assistant Examiner—Donn McGiehan
Attorney, Agent, or Firm—Holman & Stern

[57] ABSTRACT

An electrically assisted cycle including a frame and a ground engaging wheel rotatably mounted on the frame. A drive member is rotatably mounted on the frame and is arranged to be rotated by the rider of the cycle. A chain couples the drive member and the wheel and there is provided an electric motor and an associated battery carried by the frame, the output of the motor being coupled to the wheel so that the motor can propel the cycle; an electrical switch is incorporated into the rider operated drive member and is so associated with the electric motor that the motor cannot be energized unless the switch is operated by the rider applying a driving force to propel the cycle.

2 Claims, 3 Drawing Figures

CYCLE PROPELLED BY MOTOR AND PEDALS

FIELD OF THE INVENTION

This invention relates to an electrically assisted cycle, particularly but not exclusively, a bicycle.

SUMMARY OF THE INVENTION

An electrically assisted cycle according to the invention includes, a frame, a ground engaging wheel rotatably mounted on the frame, a rotatable drive member rotatably mounted on the frame and arranged to be rotated by the rider of the cycle, an endless, non-extensible, flexible member coupling said drive member and said wheel whereby rotation of said drive member propels said cycle, an electric motor and an associated power source carried by said frame, the output of said motor being coupled to said wheel whereby said motor can propel the cycle, and electrical switch means operable by the application to said drive member, by the rider, of driving force to propel the cycle, said switch being so associated with said motor that the motor cannot be energised unless said switch means is operated.

Preferably the coupling of the motor output and the wheel includes a freewheel mechanism whereby the motor output is not driven by the wheel if the wheel overruns the motor output.

Desirably said coupling includes said drive member and said endless member, and said freewheel mechanism is between the motor output and the drive member so that when the cycle is propelled by the rider without assistance from the motor the motor output is not driven.

Conveniently the drive member has associated therewith pedals whereby the rider can apply to the drive member driving force to propel the cycle and there is a degree of lost motion between the pedals and the drive member which must be taken up before the pedals drive the drive member, said switch means being operated by the take up of said degree of lost motion and there being resilient means urging the pedals in a direction relative to the drive member to restore said lost motion.

Conveniently said resilient means is incorporated in said switch means.

One example of the invention is illustrated in the accompanying drawings wherein,

DESCRIPTION OF A PREFERRED EMBODIMENT

Figure 1:
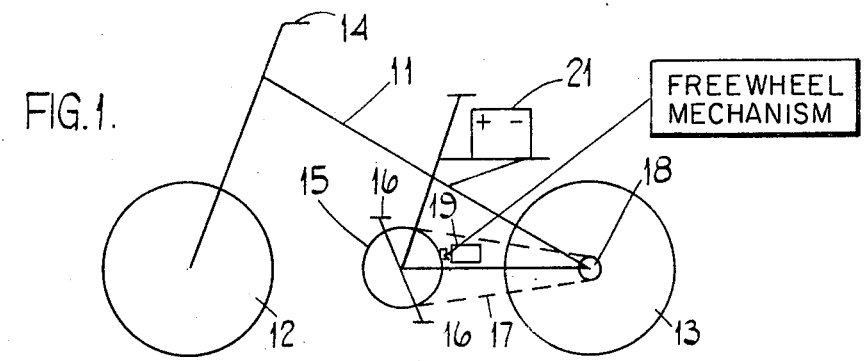
FIG. 1 is a diagrammatic representation of an electrically assisted pedal bicycle.
Figure 2:
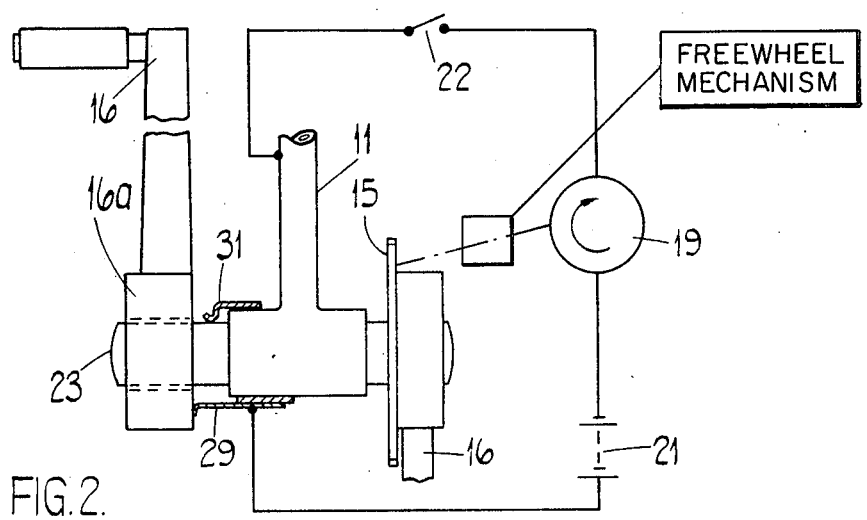
FIG. 2 is a diagrammatic representation of part of the bicycle shown in FIG. 1.
Figure 3:
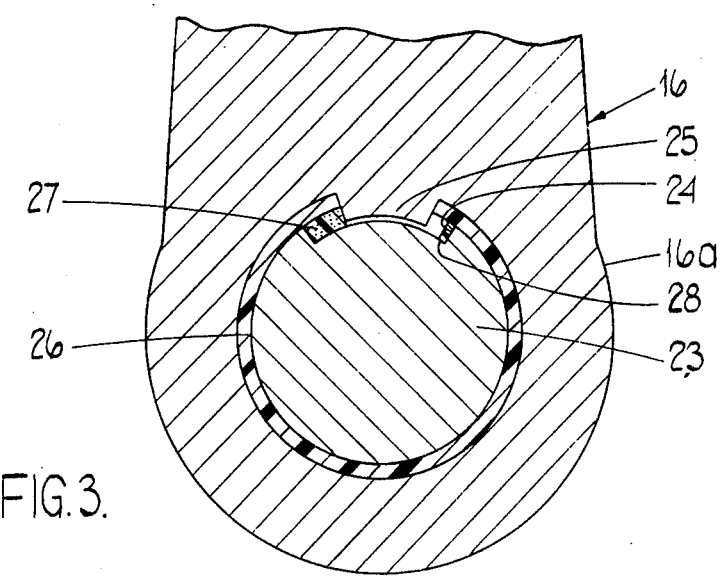
FIG. 3 is a sectional view to an enlarged scale of part of the pedal assembly shown in FIG. 2.

Referring to the drawings, the bicycle includes a frame 11 constructed from metal tube in the usual manner. Rotatably mounted on the frame 11 are first and second ground engaging wheels 12, 13 the wheel 12 being steerable by way of handle bars 14 of the frame 11, and the wheel 13 being a driving wheel. Also rotatably mounted on the frame 11 is a pedal assembly including a toothed chain wheel 15 having connected thereto pedals 16 whereby the chain wheel 15 can be rotated by a rider of the vehicle. An endless, non-extensible flexible chain 17 couples the toothed chain wheel 15 and a toothed pinion 18 carried by the wheel 13. The arrangement is conventional in so far as rotation of the chain 15 is transmitted to the wheel 13 by way of the chain 17 and pinion 18 to propel the cycle.

Secured to the frame 11 is an electric motor 19 having a rotatable output member coupled to the chain wheel 15 in any convenient manner whereby energisation of the motor 19 causes the motor to drive the wheel 13 by way of the chain wheel 15, the chain 17 and the sprocket 18. A carrier secured to the frame 11 supports an electric storage battery 21 and upon completion of an electrical circuit between the battery 21 and the motor 19, the motor 19 is energised and its output member rotates. Connected in series with the motor 19 is a manually operable control switch 22 which conveniently is positioned on the handle bars 14 of the bicycle. It will be understood that when the switch 22 is open then the motor 19 cannot be energised.

In order that the motor 19 can only assist the rider in propelling the cycle, and cannot propel the cycle along, there is provided a further electrical switch in series with the switch 22, the further switch being closed only when the rider of the cycle is applying driving force to the chain wheel 15.

The rider of the cycle applies driving force to the chain wheel 15 by way of the pedals 16 and the shaft 23 which rotatably supports the pedals 16 on the frame 11 of the cycle. The pedal 16 adjacent the chain wheel 15 is rigidly secured to the shaft 23 so that there is no lost motion between the shaft 23 and the pedal 16 and chain wheel 15. However, the pedal remote from the chain wheel 15 is coupled to the shaft 23 with a small degree of lost motion, and the boss 16a of the pedal 16, encircling the shaft 23, houses the above mentioned further switch.

The end portion of the shaft 23 extending into the boss 16a is formed with a circumferentially extending recess 24 into which extends a projection 25 integral with the boss 16a. The radial extent of the projection 25 relative to the shaft 23 is such that the free end of the projection 25 is spaced from the base of the recess 24. An electrically insulating, but physically durable sleeve 26 conveniently formed from nylon, is interposed between the inner surface of the boss 16a and the outer surface of the shaft 23, the sleeve 26 having an aperture therein through which the projection 25 passes. It will be understood therefore that the boss 16a can rotate about the axis of the shaft 23, relative to the shaft 23 through an angular distance determined by the difference in circumferential dimensions of the projection 25 and the recess 24. Moreover, it will further be understood that provided the projection 25 is in such a position within the recess 24 that it is spaced from the opposite ends of the recess 24 then the metal boss 16a will be electrically insulated from the metal shaft 23 by the sleeve 26.

Positioned between one end face of the recess 24, and the corresponding end face of the projection 25 is an electrical switching element 27 formed from an electrically insulating elastomer loaded with conductive particles. The loading of the conductive particles within the matrix of the elastomer of the element 27 is such that when the element 27 is in a relaxed, unstressed state then the conductive particles contained therein are held out of contact with one another so that the element constitutes an electrical insulator, whereas when the element 27 is subject to compression the conductive particles contained therein are brought into contact with one another and so establish electrically conducting paths through the element. Positioned between the opposite face of the projection 25 and the other end face of the recess 24 is an electrically insulating abutment 28, and the dimensions of the element 27 are such that in the relaxed state of the element 27 the projection 25 abuts the insulating abutment 28 and the element 27 occupies the whole of the circumferential clearance between the first mentioned end face of the projection 25 and the corresponding end face of the recess 24.

The element 27 is positioned on the appropriate side of the projection 25 to ensure that the element 27 is compressed between the projection 25 and the end face of the recess 24 when the rider is applying driving force to the pedals 16 to rotate the chain wheel 15 to propel the cycle. Thus during the application of driving force by the rider, by way of the pedals 16 the small degree of lost motion between the pedal boss 16a and the shaft 23 is taken up and the element 27 is compressed thereby rendering it electrically conductive so that the element 27 electrically interconnects the boss 16a and the shaft 23.

Carried by the frame 11 are first and second electrical, wiping contacts 29, 31 the wiping contact 29 being electrically insulated from the frame 11, while the contact 31 is electrically connected to the frame. The wiping contact 29 is in sliding engagement with the boss 16a, while the wiping contact 31 is in sliding engagement with the shaft 23. Thus when the boss 16a is electrically connected to the shaft by way of the element 27 then a circuit is completed between the wiping contacts 29, 31. The wiping contact 29 which is electrically insulated from the frame 11 is connected to one pole of the battery 21, the other pole of the battery 21 being connected through the motor 19 and the switch 22 in series to the frame 11. Thus when the switch 22 is closed, and driving force is applied by the rider of the cycle by way of the pedals 16 then the electrical circuit of the motor 19 will be completed and the motor will be energised to assist the rider in propelling the bicycle. However, should the rider cease to apply driving force to the pedals, for example by lifting his feet from the pedals then the resilience of the element 27 will return the boss 16a to its original position relative to the shaft 23 and in the process will become non-conductive breaking the electrical connection between the boss 16a and the shaft 23 and so de-energising the motor.

It will be understood that provided the shaft 23 makes good electrical connection with the frame 11 then the wiping contact 31 can be dispensed with. Moreover, since the motor 19 draws a relatively heavy current then the switch including the element 27 and the manually operable switch 22 could be used to control a relay which in turn controls energisation of the motor 19.

It will be appreciated that if desired the lost motion connection incorporating the switching element 27 could be between the chain wheel 15 and the shaft 23, the effect being similar to that described above in that should the chain wheel overrun the shaft 23, for example when the rider ceases to apply driving force to the pedals, the switching element will be rendered non-conductive breaking the motor circuit.

It will be understood that additional resilient means can be incorporated to aid the element 27 in restoring to its non-conductive condition, and that alternative forms of switch not utilizing the element 27, but nevertheless operated by the rider applying driving force can be substituted in the arrangement described above.

It is recognised that full driving force may only be applied by way of the boss 16a during the downward stroke of the pedals. However, it is believed that during the upward stroke of the pedal the lost motion will not be re-established. However, it is to be understood that if desired the switch can have associated therewith a simple electrical delay circuit whereby opening of the switch does not simultaneously result in de-energisation of the motor 19.

Alternatively, rather than employing a delay circuit a similar lost motion operated switch can be incorporated into the opposite pedal assembly, the two switches being electrically connected in parallel so that at any given point in the rotation of the pedal shaft at least one of the switches will be closed provided that the rider is applying driving force to the pedals.

The coupling between the output of the electric motor 19 and the driven wheel 13 includes a freewheel mechanism of any convenient form whereby the output of the motor 19 is not driven by the wheel 13 in the event that the wheel 13 overruns the motor output. Conveniently the freewheel mechanism is positioned between the output of the motor 19 and the chain wheel 15 so that when the cycle is propelled by the rider without the assistance of the motor 19, the motor output is not driven.

We claim:

1. An electrically assisted cycle including a frame, a ground engaging wheel rotatably mounted on the frame, a rotatable drive member rotatably mounted on the frame, rider operable pedals coupled to the drive member whereby the rider can apply driving force, an endless, non-extensible flexible member coupling said drive member and said wheel whereby rotation of said drive member propels said cycle, an electric motor and an associated power source carried by said frame, the output of said motor being coupled to said wheel whereby said motor can apply driving force to said wheel, and an electrical switch means operable by the application to said pedals by the rider of driving force to propel the cycle, said switch being so associated with said motor that the motor cannot be energized unless said switch means is operated, wherein there is a degree of lost motion between the pedals and the drive member which must be taken up before the pedals drive the drive member, said switch means being operated by th take-up of said degree of lost motion and there being resilient means urging the pedals in a direction relative to the drive member to restore said lost motion.

2. A cycle as claimed in claim 1 wherein said resilient means is incorporated in said switch means.

* * * * *